US00RE48728E

(19) United States
(12) Reissued Patent
Jacoby et al.

(10) Patent Number: US RE48,728 E
(45) Date of Reissued Patent: Sep. 14, 2021

(54) CONTROL DEVICE

(71) Applicant: Lutron Technology Company LLC, Coopersburg, PA (US)

(72) Inventors: Elliot G. Jacoby, Glenside, PA (US); Jason C. Killo, Emmaus, PA (US); Brad Michael Kreschollek, Bethlehem, PA (US)

(73) Assignee: Lutron Technology Company LLC, Coopersburg, PA (US)

(21) Appl. No.: 29/726,077

(22) Filed: Feb. 28, 2020

Related U.S. Patent Documents

Reissue of:
(64) Patent No.: Des. 807,763
Issued: Jan. 16, 2018
Appl. No.: 29/578,733
Filed: Sep. 23, 2016

U.S. Applications:
(60) Division of application No. 29/695,315, filed on Jun. 18, 2019, which is an application for the reissue of
(Continued)

(51) LOC (13) Cl. ..... 10-04
(52) U.S. Cl.
USPC ..... D10/50; D13/162.1; D13/164
(58) Field of Classification Search
USPC ..... D13/162.1, 164; D10/49, 50
(Continued)

(56) References Cited

U.S. PATENT DOCUMENTS 4,316,256 A 2/1982 Hendricks et al.
4,780,573 A 10/1988 Own
(Continued)

OTHER PUBLICATIONS

BTicino Spa, Matix Brochure, May 2009, 16 pages.
(Continued)

*Primary Examiner* — Philip S Hyder
(74) *Attorney, Agent, or Firm* — Saidman DesignLaw Group, LLC

(57) CLAIM

We claim the ornamental design for a control device, as shown and described.

DESCRIPTION

[This application is a continuation of prior pending U.S. application Ser. No. 29/515,922, filed Jan. 28, 2015; the entirety of which is expressly incorporated by reference herein.]
*This application is a divisional reissue of U.S. application Ser. No. 29/695,315, which is an application for reissue of U.S. Pat. No. D. 807,763, which issued from U.S. application Ser. No. 29/578,733, filed Sep. 23, 2016, which is a continuation of prior U.S. application Ser. No. 29/515,922, filed Jan. 28, 2015, now U.S. Pat. No. 769,829, issued Oct. 25, 2016; the entireties of which are expressly incorporated by reference herein.*
FIG. 1 is a perspective view of a control device shoving our new design.
FIG. 2 is a front view thereof.
FIG. 3 a left side view thereof.
FIG. 4 is a right side view thereof.
FIG. 5 is a top view thereof; and,
FIG. 6 is a bottom view thereof.
The rear [views] *view* forms no part of the design and is omitted. The portions of the drawings appearing in *dashed* broken lines are for environment only and do not form part of the claimed design.
*The dot-dash broken lines illustrate boundaries which do not form part of the claimed design.*

1 Claim, 4 Drawing Sheets

Matter enclosed in heavy brackets [ ] appears in the original patent but forms no part of this reissue; matter printed in italics indicates the additions made by reissue.

Amended

Related U.S. Application Data

Pat. No. Des. 807,763, which is a continuation of application No. 29/515,922, filed on Jan. 28, 2015, now Pat. No. Des. 769,829.

(58) Field of Classification Search

CPC . F23N 5/20; F23N 5/203; F23N 5/206; F23N 2025/12; F23N 2041/02; F24F 11/00; F24F 11/001; F24F 11/0009; F24F 11/0012; F24F 2011/0057; F24F 2011/0073; F24F 2011/0091; G05D 23/1917; H01H 9/165; H01H 9/181; H01H 9/182; H01H 2009/187

See application file for complete search history.

(56) References Cited

U.S. PATENT DOCUMENTS

| | | | | |
|---|---|---|---|---|
| D309,268 | S | | 7/1990 | Wada et al. |
| D310,340 | S | | 9/1990 | Wada et al. |
| D316,681 | S | | 5/1991 | Takasuna et al. |
| D320,410 | S | | 10/1991 | Gotham |
| D364,350 | S | | 11/1995 | Pasquarette et al. |
| D364,573 | S | | 11/1995 | Pearsall |
| 6,260,765 | B1 | | 7/2001 | Natale et al. |
| D453,742 | S | | 2/2002 | Butler et al. |
| D466,090 | S | | 11/2002 | Bennett et al. |
| D547,273 | S | | 7/2007 | Mierta et al. |
| D549,710 | S | | 8/2007 | Hynecek et al. |
| D588,035 | S | | 3/2009 | Schmalz et al. |
| 7,566,996 | B2 | | 7/2009 | Altonen et al. |
| D623,606 | S | | 9/2010 | Nakai et al. |
| D633,448 | S | | 3/2011 | Biery et al. |
| D642,992 | S | | 8/2011 | Sasaki et al. |
| D646,185 | S | | 10/2011 | Edgar |
| D649,123 | S | | 11/2011 | Jacoby et al. |
| D649,124 | S | | 11/2011 | Jacoby et al. |
| D649,520 | S | | 11/2011 | Jacoby et al. |
| D666,927 | S | | 9/2012 | Krumpe et al. |
| D678,223 | S | | 3/2013 | Wisniewski et al. |
| D686,167 | S | | 7/2013 | Wisniewski et al. |
| 8,525,372 | B2 | | 9/2013 | Huang |
| D690,661 | S | | 10/2013 | Wisniewski et al. |
| D694,195 | S | | 11/2013 | Gammon et al. |
| D706,729 | S | | 6/2014 | Joshi et al. |
| D706,731 | S | | 6/2014 | Altonen et al. |
| D706,732 | S | | 6/2014 | Altonen et al. |
| D707,186 | S | | 6/2014 | Sloan |
| D707,191 | S | | 6/2014 | Altonen et al. |
| D714,234 | S | | 9/2014 | Altonen et al. |
| D717,742 | S | | 11/2014 | Larkin et al. |
| D720,306 | S | | 12/2014 | Altonen et al. |
| 8,978,994 | B2 | | 3/2015 | Moore et al. |
| D734,277 | S | | 7/2015 | Jacoby et al. |
| D737,154 | S | | 8/2015 | Jacoby et al. |
| 9,119,240 | B2 | | 8/2015 | Nagazoe |
| D738,229 | S | | 9/2015 | Jiang et al. |
| D738,753 | S | | 9/2015 | Edgar |
| 9,124,130 | B2 | | 9/2015 | Altonen et al. |
| 9,157,647 | B2 | | 10/2015 | Leen et al. |
| 9,167,666 | B1 | | 10/2015 | Billheimer et al. |
| D742,335 | S | | 11/2015 | Yamaguchi |
| D750,981 | S | * | 3/2016 | Jacoby ..... D10/50 |
| D768,582 | S | | 10/2016 | Jacoby et al. |
| D770,393 | S | | 11/2016 | Jacoby et al. |
| D775,975 | S | * | 1/2017 | Jacoby ..... D10/50 |
| D775,976 | S | * | 1/2017 | Jacoby ..... D10/50 |
| D780,699 | S | | 3/2017 | Zhang |
| D784,168 | S | * | 4/2017 | Jacoby ..... D10/50 |
| D797,684 | S | | 9/2017 | Poulheim et al. |
| D809,943 | S | | 2/2018 | Jacoby et al. |
| D834,535 | S | | 11/2018 | Poulheim et al. |
| D835,051 | S | | 12/2018 | Poulheim et al. |
| 2011/0253516 | A1 | | 10/2011 | Figueroa et al. |
| 2012/0091213 | A1 | | 4/2012 | Altonen et al. |
| 2013/0285472 | A1 | | 10/2013 | Bull |
| 2014/0184418 | A1 | | 7/2014 | Maeda et al. |
| 2014/0268630 | A1 | | 9/2014 | Samuels |
| 2015/0076991 | A1 | | 3/2015 | Yamamoto et al. |
| 2015/0316285 | A1 | | 11/2015 | Clifton et al. |

OTHER PUBLICATIONS

Dynalite Intelligent Light Pty Ltd., Light News, Aug. 2005, 8 pages, issue 2.

Design U.S. Appl. No. 29/502,412, filed Sep. 16, 2014. (Unpublished).

Design U.S. Appl. No. 29/515,919, filed Jan. 28, 2015. (Unpublished).

Design U.S. Appl. No. 29/515,921, filed Jan. 28, 2015. (Unpublished).

Design U.S. Appl. No. 29/515,924, filed Jan. 28, 2015. (Unpublished).

* cited by examiner

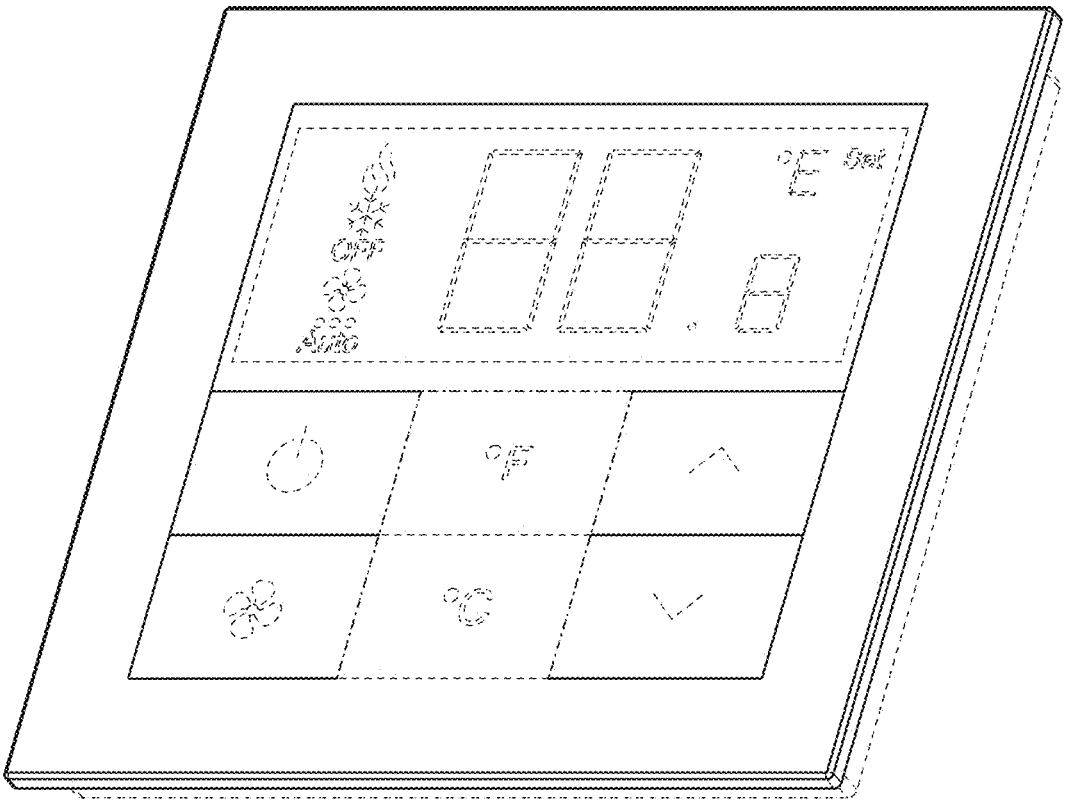
FIG. 1 Amended

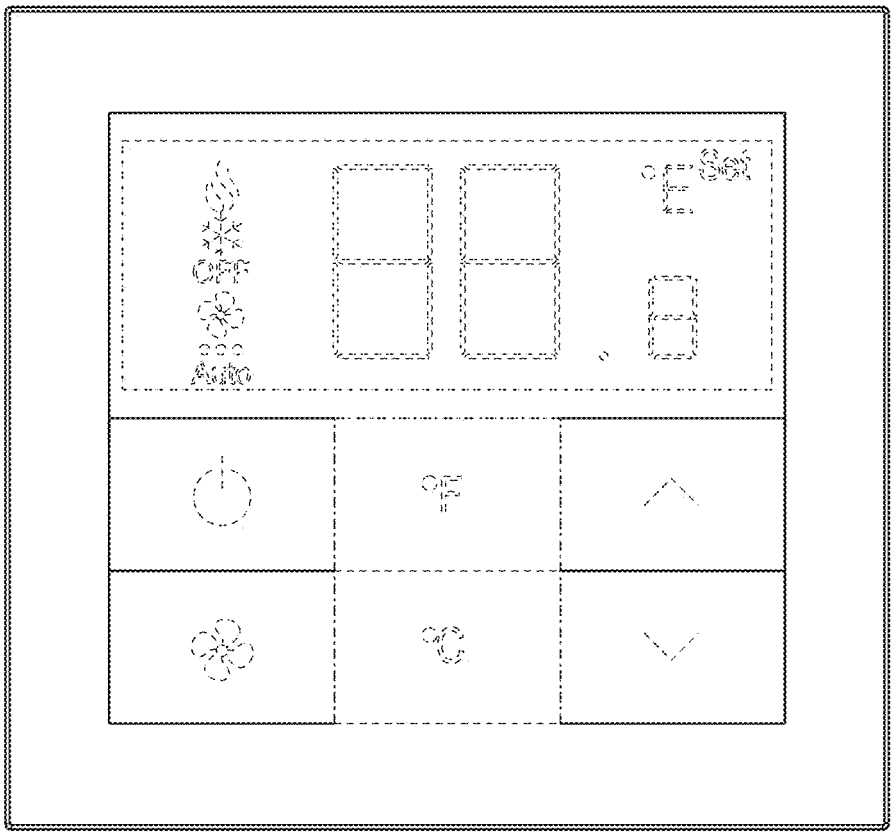
FIG. 2 Amended

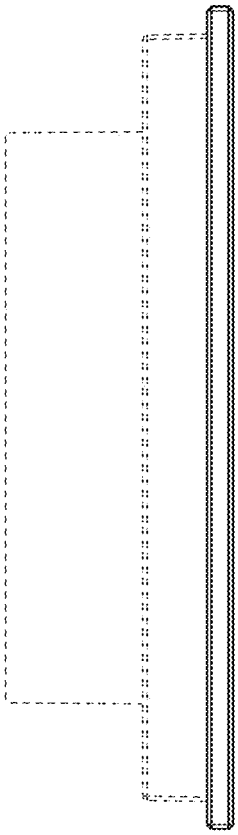
FIG. 3 Amended
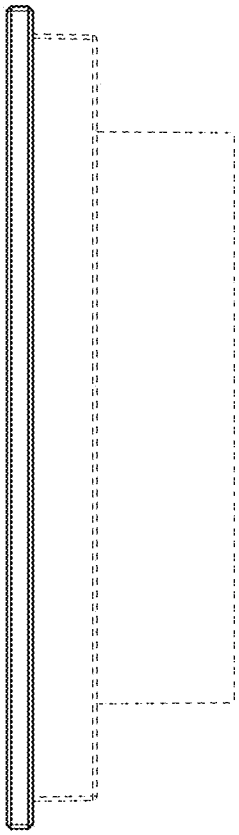
FIG. 4 Amended

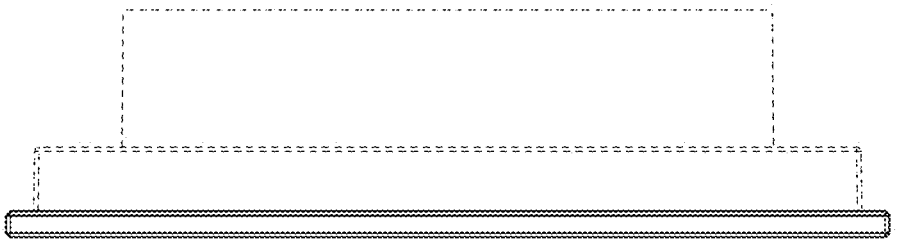
FIG. 5 Amended
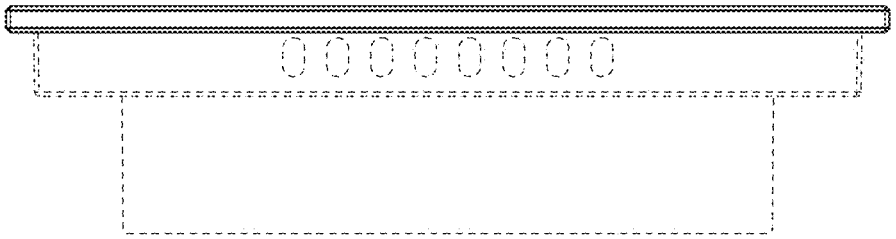
FIG. 6 Amended